US010856699B2

(12) United States Patent
Collins et al.

(10) Patent No.: US 10,856,699 B2
(45) Date of Patent: Dec. 8, 2020

(54) CUTTING BOARD

(71) Applicants:Scott Jackson Collins, Mequon, WI (US); Paul Albert Omdoll, Naples, FL (US)

(72) Inventors: Scott Jackson Collins, Mequon, WI (US); Paul Albert Omdoll, Naples, FL (US)

(73) Assignees: Scott Jackson Collins, Mequon, WI (US); Paul Albert Omdoll, Naples, FL (US)

( * ) Notice: Subject to any disclaimer, the term of this patent is extended or adjusted under 35 U.S.C. 154(b) by 194 days.

(21) Appl. No.: 15/969,168

(22) Filed: May 2, 2018

(65) Prior Publication Data
US 2018/0325323 A1    Nov. 15, 2018

Related U.S. Application Data

(60) Provisional application No. 62/504,036, filed on May 10, 2017.

(51) Int. Cl.
*A47J 47/00* (2006.01)
(52) U.S. Cl.
CPC .................. *A47J 47/005* (2013.01)
(58) Field of Classification Search
CPC .................. A47J 47/00; A47J 47/005
See application file for complete search history.

(56) References Cited

U.S. PATENT DOCUMENTS

| 648,632 A | 5/1900 | Parker |
| 1,233,184 A | 7/1917 | Chadwick |
| 1,438,157 A | 12/1922 | Bukachek et al. |
| D159,881 S | 8/1950 | Zekowski |
| 2,609,024 A | 9/1952 | Russ |
| 2,796,902 A | 6/1957 | Mercury |
| 3,089,464 A | 5/1963 | Mendels |
| D213,093 S | 1/1969 | Thomas |
| 3,498,470 A | 3/1970 | Thomas |

(Continued)

FOREIGN PATENT DOCUMENTS

| CA | 2980638 | 9/2017 |
| CA | 2980633 | 3/2018 |

(Continued)

OTHER PUBLICATIONS www.amazon.com online catalog—Vettore Large Commercial Cutting Board, purchased from amazon.com on or about May 23, 2017.

(Continued)

*Primary Examiner* — Tyrone V Hall, Jr.
(74) *Attorney, Agent, or Firm* — Boyle Fredrickson S.C.

(57) ABSTRACT

A cutting board defined by a body and includes a handle that is offset from the orthogonal axis of the body. The handle has a generally T-shape and includes a first grip site and a second grip site that are separated from one another by a stem defined by the body of the cutting board. The first and second grip sites are associated with dissimilar and preferably adjacent sides of the body. The handle is oriented such that, when vertically suspended from the handle via interaction with the first and second grip sites, the stem defined by the body extends along an axis that is coincident with the center of gravity of the cutting board.

20 Claims, 10 Drawing Sheets

(56) References Cited

U.S. PATENT DOCUMENTS

| | | |
|---|---|---|
| 3,598,164 A | 8/1971 | August |
| 3,837,634 A | 9/1974 | Cobb |
| 4,203,231 A | 5/1980 | Van Note |
| D258,036 S | 1/1981 | Sabin |
| D259,166 S | 5/1981 | Krusche |
| D264,531 S | 5/1982 | Trode |
| D281,850 S | 12/1985 | Morin |
| 4,653,737 A | 3/1987 | Haskins |
| D301,820 S | 6/1989 | Wasserman |
| 4,907,789 A | 3/1990 | Tice |
| D308,461 S | 6/1990 | Hosea |
| 4,966,297 A * | 10/1990 | Doty ................ A47G 19/06 206/564 |
| D335,797 S | 5/1993 | DeGrow |
| D336,407 S | 6/1993 | Harding et al. |
| D339,507 S | 9/1993 | Ancona et al. |
| D348,809 S | 7/1994 | Ladwig |
| 5,363,755 A | 11/1994 | Liang |
| 5,383,503 A | 1/1995 | Johnson |
| 5,386,654 A | 2/1995 | Kroenke |
| D366,780 S | 2/1996 | Brooks |
| 5,527,022 A | 6/1996 | Gibson |
| D372,176 S | 7/1996 | Meisner |
| D374,380 S | 10/1996 | Sawatsky |
| D381,564 S | 7/1997 | Kolada |
| D387,623 S | 12/1997 | Brooks |
| D390,718 S | 2/1998 | Howland et al. |
| 5,865,105 A | 2/1999 | Pepelanov |
| 5,984,294 A | 11/1999 | Bogomolny |
| D442,830 S | 5/2001 | Raucci |
| 6,386,531 B1 | 5/2002 | Prosser |
| 6,422,551 B1 | 7/2002 | Brotz |
| D462,965 S | 9/2002 | Pentz |
| 6,478,292 B1 | 11/2002 | Sellers |
| D471,025 S | 3/2003 | Chiu |
| D472,776 S | 4/2003 | Porter |
| D473,112 S | 4/2003 | de Groote |
| 6,651,970 B2 | 11/2003 | Scott |
| 6,695,299 B1 | 2/2004 | Brotz |
| D492,884 S | 7/2004 | Swope |
| 6,789,792 B1 | 9/2004 | Angland |
| 6,846,449 B2 | 1/2005 | Martin et al. |
| D501,761 S | 2/2005 | Glander |
| D507,463 S | 7/2005 | Brookman et al. |
| 6,913,255 B2 | 7/2005 | Porchia et al. |
| 6,932,336 B1 | 8/2005 | Nudo |
| 6,955,722 B2 | 10/2005 | Ackerman |
| D512,281 S | 12/2005 | Omdoll |
| 6,986,931 B2 | 1/2006 | Ackerman et al. |
| 6,991,844 B2 | 1/2006 | LeBoeuf et al. |
| 6,994,335 B2 | 2/2006 | Porchia et al. |
| D519,016 S | 4/2006 | Nudo |
| 7,026,034 B2 | 4/2006 | LeBoeuf et al. |
| 7,036,809 B1 | 5/2006 | Mitchell |
| D522,784 S | 6/2006 | Omdoll |
| 7,059,952 B1 | 6/2006 | McRoberts |
| D524,096 S | 7/2006 | Babkes |
| D525,063 S | 7/2006 | Woods et al. |
| 7,125,011 B2 | 10/2006 | McLaughlin |
| 7,134,653 B1 | 11/2006 | Ladenheim |
| 7,178,798 B1 | 2/2007 | Funk et al. |
| D538,096 S | 3/2007 | Bartell |
| D543,423 S | 5/2007 | Benson |
| D549,531 S | 8/2007 | Kishbaugh et al. |
| D551,040 S | 9/2007 | Weeks |
| D563,180 S | 3/2008 | Young et al. |
| D573,419 S | 7/2008 | Kaposi |
| D574,200 S | 8/2008 | Pearl |
| D584,117 S | 1/2009 | Curtin |
| D587,031 S | 2/2009 | Pourounidis et al. |
| D587,539 S | 3/2009 | Almeda et al. |
| 7,533,875 B2 | 5/2009 | Willen et al. |
| D605,908 S | 12/2009 | Pearl et al. |
| 7,637,488 B2 | 12/2009 | Zeng |
| 7,647,654 B2 | 1/2010 | Shamroth |
| 7,758,029 B2 | 7/2010 | Lim et al. |
| D620,761 S * | 8/2010 | Boudreau ................ D7/549 |
| D624,921 S | 10/2010 | Hart et al. |
| D631,952 S | 2/2011 | Marcoff |
| D648,632 S | 11/2011 | Ferguson et al. |
| 8,141,860 B2 | 3/2012 | Goldman |
| 8,148,651 B1 | 4/2012 | Coppola |
| D661,354 S | 6/2012 | Karnis |
| D664,405 S | 7/2012 | Chen |
| 8,220,789 B2 | 7/2012 | Pourounidis et al. |
| 8,286,956 B2 | 10/2012 | Pearl et al. |
| 8,360,407 B2 | 1/2013 | Kent |
| D687,268 S | 12/2014 | Hoffstadt |
| D728,305 S | 5/2015 | Lou |
| 9,155,427 B1 | 10/2015 | Kumar |
| D793,823 S | 8/2017 | Wu |
| D796,276 S | 9/2017 | King |
| D802,379 S | 11/2017 | Raphael |
| 2002/0195763 A1 | 12/2002 | Benjamin |
| 2003/0047044 A1 | 3/2003 | Porchia et al. |
| 2003/0049294 A1 | 3/2003 | Porchia et al. |
| 2003/0049410 A1 | 3/2003 | Munagavalasa et al. |
| 2003/0071406 A1 | 4/2003 | Sellers |
| 2004/0011795 A1 | 1/2004 | Porchia et al. |
| 2004/0229554 A1 | 11/2004 | Kaposi |
| 2006/0151931 A1 | 7/2006 | Mitchell |
| 2007/0001359 A1* | 1/2007 | Pearl .................... A47J 47/005 269/289 R |
| 2007/0245573 A1 | 10/2007 | Willen et al. |
| 2008/0048376 A1 | 2/2008 | Farmer et al. |
| 2009/0014935 A1 | 1/2009 | Zeng |
| 2009/0096150 A1 | 4/2009 | Cihan et al. |
| 2009/0194925 A1 | 8/2009 | Rolf |
| 2009/0283952 A1 | 11/2009 | Sellers |
| 2010/0194016 A1 | 8/2010 | Tsui |
| 2011/0169208 A1 | 7/2011 | Almeda et al. |
| 2011/0221111 A1 | 9/2011 | Stigall |
| 2011/0221112 A1 | 9/2011 | Kent |
| 2012/0034227 A1 | 2/2012 | Arlen |
| 2012/0034427 A1 | 2/2012 | Hsieh |
| 2012/0047696 A1 | 3/2012 | Jung et al. |
| 2012/0093571 A1 | 4/2012 | Yeh |
| 2013/0049275 A1 | 2/2013 | Morgan |
| 2015/0053056 A1 | 2/2015 | Ramos |
| 2018/0084952 A1 | 3/2018 | Eckholm et al. |
| 2018/0140141 A1 | 5/2018 | Russell |

FOREIGN PATENT DOCUMENTS

| | | |
|---|---|---|
| DE | 20009703 U1 | 8/2000 |
| DE | 102006018729 | 10/2007 |
| EP | 1549456 | 3/2008 |
| EP | 3300644 | 4/2018 |
| EP | 3300645 | 4/2018 |
| GB | 2179240 | 3/1987 |
| GB | 2234891 A | 2/1991 |
| GB | 2408444 | 6/2005 |
| GB | 2449687 | 12/2008 |
| MX | 2017012508 | 9/2017 |
| MX | 2017012502 | 5/2018 |
| WO | 2013025244 | 2/2013 |
| WO | 2014074062 | 5/2014 |

OTHER PUBLICATIONS www.amazon.com online catalog—OXO Good Grips Cutting and Carving Board, purchased from www.amazon.com on or about May 23, 2017.

www.amazon.com online catalog—Dexas Non-Slip Wraparound Grippboard, purchased from www.amazon.com on or about May 23, 2017.

www.amazon.com online catalog—Epicurean Non-slip Series Cutting Board, purchased from www.amazon.com on or about May 23, 2017.

www.amazon.com online catalog—CleanCut Cutting Board Set, purchased from www.amazon.com on or about May 23, 2017.

www.amazon.com online catalog—Kitchen District by Architec (56) References Cited

OTHER PUBLICATIONS

Bridge Cutting Board, purchased from www.amazon.com on or about May 23, 2017.
www.amazon.com online catalog—Elbee 625 Heavy-Duty Non-Slip Gripping Cutting Board, purchased from www.amazon.com on or about May 23, 2017.
www.amazon.com online catalog—Rekukos Nonslip Double Sided Plastic Chopping Cutting Board, purchased from www.amazon.com on or about May 23, 2017.
www.amazon.com online catalog—Farberware Classic Nonslip Cutting Board, purchased from www.amazon.com on or about May 23, 2017.
www.amazon.com online catalog—Oneida Colours Cutting Board, purchased from www.amazon.com on or about May 23, 2017.
www.amazon.com online catalog—Farberware Nonslip Plastic Cutting Board, purchased from www.amazon.com on or about May 23, 2017.
www.amazon.com online catalog—Neoflam Marble Cutting Board, 11-inch-by-14-inch, red purchased from www.amazon.com on or about May 23, 2017.
www.amazon.com online catalog—Farberware Nonslip Plastic Cutting Board Red, purchased from www.amazon.com on or about May 23, 2017.
www.amazon.com online catalog—Neoflam Poly Cutting Board, purchased from www.amazon.com on or about May 23, 2017.
www.amazon.com online catalog—Unique Double Sided Non Slip Cutting Board, purchased from www.amazon.com on or about May 23, 2017.
www.amazon.com online catalog—KitchenAid Poly Board with Santoprene Corners, purchased from www.amazon.com on or about May 23, 2017.
www.amazon.com online catalog—Dutis 3-piece Dishwasher Safe Plastic Cutting Board Set, purchased from www.amazon.com on or about May 23, 2017.
www.amazon.com online catalog—CleanCut NonSlip, purchased from www.amazon.com on or about May 23, 2017.
www.amazon.com online catalog—Cuisinart 14 Semi Transparent Board, purchased from www.amazon.com on or about May 23, 2017.
www.amazon.com online catalog—Cuisinart 15 Semi Transparent Board, purchased from www.amazon.com on or about May 23, 2017.
Extended European Search Report dated Mar. 7, 2018 (EP Application No. 17194258.4).
Extended European Search Report dated Mar. 7, 2018 (EP Application No. 17194259.2).
European Search Report dated Sep. 18, 2018 (EP Application No. 18171630.9).

* cited by examiner

CUTTING BOARD

CROSS REFERENCE TO RELATED APPLICATIONS

This application claims priority to U.S. Provisional Patent Application Ser. No. 62/504,036 titled "Commercial Kitchen Cutting Board" filed on May 10, 2017 and the disclosure of which is expressly incorporated herein.

FIELD OF THE INVENTION

The present invention relates to a cutting board, and more particularly, to a cutting board having a handle configuration that defines dual grip points and that improves the utility, sanitary condition, and the ergonomics associated with use, storage, and user interaction with the cutting board.

BACKGROUND OF THE INVENTION

Cutting boards are well known in the art as being useful in food preparation operations. Cutting boards are commonly formed of materials that are selected to maintain the integrity of the cutting edge of the cutlery while protecting the underlying counter surfaces from both the mess associated with the food preparation activities as well as damage by interaction with the cutlery. Cutting boards are provided in a variety of sizes, shapes, and configurations that are commonly configured for suitability with an intended operation or food preparation sequence.

Known cutting board configurations are provided in a number of shapes and configurations and can be formed from a number of materials. Preferred cutting boards are formed from robust materials that provide a cutting surface that is suited to resist penetration by cutting utensils, such as knives and cutlery tools, and yet negligibly impact the sharpened edge of the cutlery tools during use of the cutting board. Yet various shortcomings associated with known cutting boards exist.

Although many cutting board are provided with a substantially square, rectilinear, round, or oval shape, many other cutting boards are provided with a handle that extends in an outward radial direction from the primary cutting surface defined by the shape of the cutting board. Handles associated with such cutting boards are generally constructed to be gripped by the user during transport of the cutting board wherein the body of the cutting board is maintained in a generally horizontal orientation to maintain the desired placement of the food stuffs relative to the cutting surface. Handles that extend in a substantially outward radial direction relative to the cutting surface increase the space required to store such cutting boards when the same are not in use and occupy greater counter space during use of the cutting board. Still further, depending on the curvilinear shape of the handle and/or cutting boards, such cutting boards are frequently ill-suited for storage in standing or hanging orientations.

Recognizing some such shortcomings, others provide cutting boards that are constructed to define a hook or hanging structure associated with an edge portion of the cutting board but generally more radially inboard of the exterior footprint of the cutting board. Although such cutting boards can improve the ability to hang the cutting board and provide a more compact footprint of the cutting board when considered in conjunction with the size and shape of the cutting surface, such configurations present other shortcomings associated with the use and storage of the resultant cutting board.

Some such cutting boards commonly have a cutout or recess formed laterally through the surface of the cutting board or formed in an edge or end thereof. Cutting boards with handles defined by radially bounded openings formed through the cutting board are commonly ill-suited for hanging orientations when not in use. Although cutouts formed in the edge of the cutting board improve the ability to support cutting boards having such features when not in use, such cutouts, as well as radially bounded openings formed through the body of the cutting board, present other complications associated with quickly assessing the orientation of the cutting board and/or the location of such handles when hung or stored in a drying rack or the lack. That is, when stored in a drying rack or oriented in a hanging orientation, adjacent cutting boards tend to overlie and thereby obscure the handle structure associated with adjacent cutting boards. Such considerations make visual inspection of the handle features difficult or impossible.

Still another shortcoming of known cutting boards, and the handle features associated therewith, relate to the ergonomics associated with user interaction with the cutting board. Whether formed as an outward radially extending handle structure, a radially bounded handle structure, or as an open sided handle/hanging structure, use of cutting boards commonly requires transport of the same between work surfaces, sinks or other cleaning activities, and drying or storage locations. When not used to transport cut food stuffs, user's commonly transport the cutting boards in a vertically suspended or hanging orientation from the user's hand. The construction of the handle, relative to the majority of the structure of the cutting board, tends to increase the load subjected to the wrist of the user during transport of the cutting board when the cutting board is oriented in a vertical orientation. Still further, various opportunities exist with which user interaction and/or support of the cutting board in a secure manner can be improved during both transport and use of the underlying cutting board.

Accordingly, there is a need for a cutting board having a handle structure whose position or orientation can be expeditiously assessed regardless of a position and/or orientation of the cutting board and/or the proximity of the cutting board to other cutting boards. There is a further need for a cutting board having a handle structure that is readily accessible from more than one radial direction. There is a still further need to provide a cutting board that is constructed to provide improved secure and ergonomic interaction with the cutting board during both use and transport.

SUMMARY OF THE INVENTION

The present invention discloses a cutting board that overcomes one or more of the drawbacks mentioned above. A cutting board according to one aspect of the present application includes a body and includes a handle that is offset from the orthogonal axis of the body. The handle has a generally T-shape and includes a first grip site and a second grip site that are separated from one another by a stem defined by the body of the cutting board. The first and second grip sites are associated with dissimilar and preferably adjacent sides of the body. The handle is oriented such that, when vertically suspended from the handle via interaction with the first and second grip sites, the stem defined by the body extends along an axis that is coincident with the center of gravity of the cutting board.

Another aspect of the present application that is useable or combinable with one or more of the above aspect discloses a cutting board that is defined by a body having an upper facing surface and downward facing surface that define respective cutting surfaces. A perimeter of the body extends between the upper facing surface and the downward facing surface. A first grip site and a second grip site are each defined by a respective cutout defined by the body and oriented along the perimeter of the body.

A further aspect of the present application that is useable or combinable with one or more of the above aspects discloses a cutting board that is defined by a body. The body defines a footprint of the cutting board associated with at least one cutting surface that is circumscribed by a boundary of the footprint. A handle is defined by the body and is offset from a longitudinal centerline axis of the body. The handle has a first cantilevered portion and a second cantilevered portion and is oriented relative to the body such that an axis located between the first cantilevered portion and the second cantilevered portion is oriented at an acute angle relative to a longitudinal centerline axis of the body and intersects a center of gravity of the body when the body is supported by the handle.

Another aspect of the present application that is useable or combinable with one or more of the above aspects discloses a method of forming a cutting board. The cutting board is defined by a body formed to have a generally planar shape and a thickness. A handle is defined by a portion of the body such that the handle includes a first hook portion and a second hook portion. The first hook portion is oriented to open toward a longitudinal end of the body and the second hook portion is oriented to open toward a lateral edge of the body such that openings associated with the respective first and second hook portions are oriented on adjacent sides of the body of the cutting board.

Various other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications. Other features, aspects, and advantages of the invention made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF PARTICULAR EMBODIMENTS

FIGS. 1-8 show various views of a cutting board 20 according to the preferred embodiment of the present invention. Referring to FIGS. 1-8, cutting board 20 is defined by a body 22 having a boundary edge or perimeter 24 that circumscribes body 22. Perimeter 24 includes a first lateral edge 26, a second lateral edge 28, a first longitudinal end 30 and a second longitudinal end 32. As disclosed further below, lateral edges 26, 28 extend in direction that is aligned with the longitudinal axis of body 22 and longitudinal ends 30, 32 are oriented to extend in a crossing direction, and preferably and orthogonal direction relative to a longitudinal axis of body 22. It should be appreciated that, if provided in a generally square shape, the respective ends and edges associated with perimeter 24 would have similar dimensions.

Figure 2:
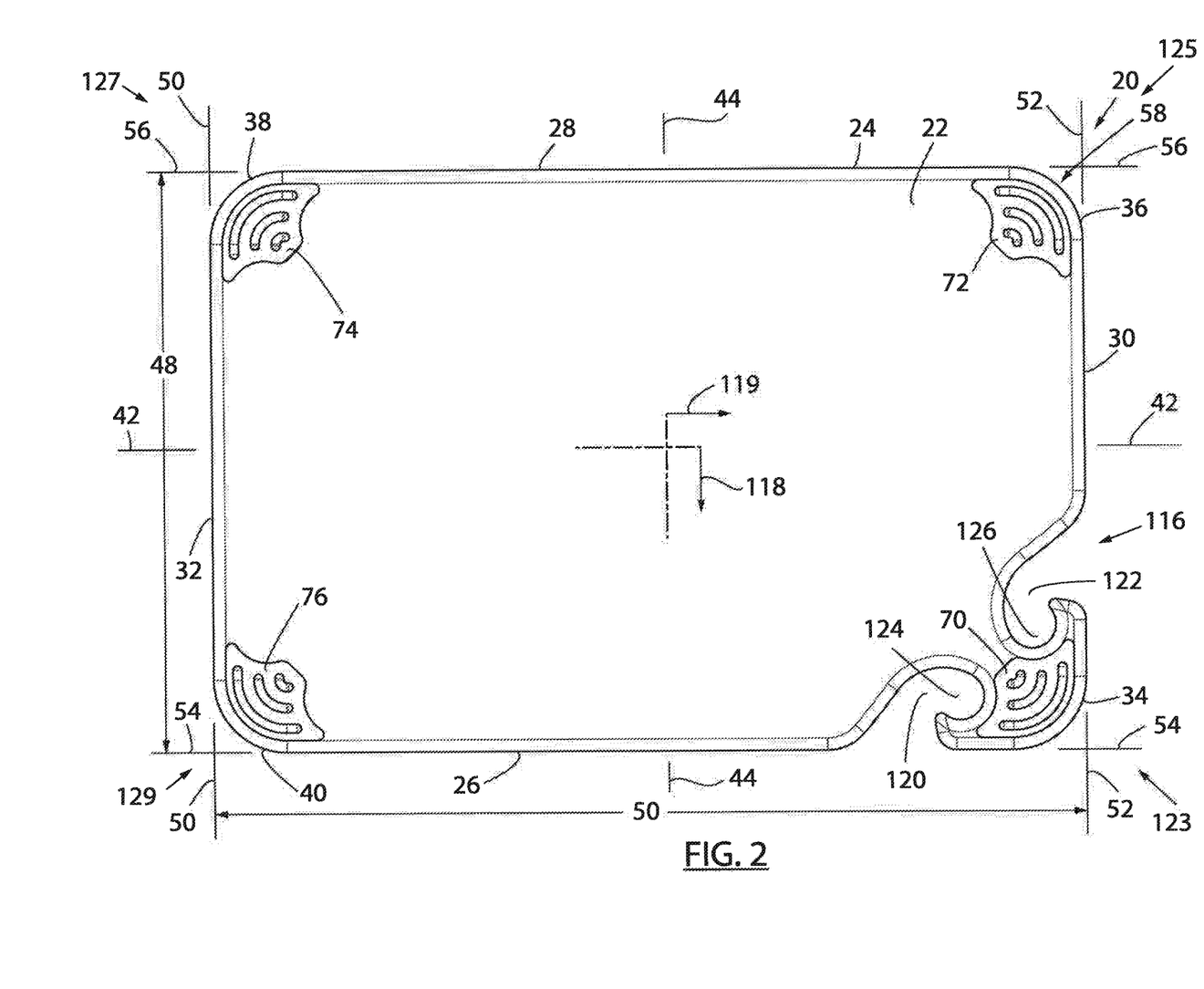
FIG. 2 is a plan view of one cutting surface of the cutting board shown in FIG. 1.

Regardless of the shape of cutting board 20, perimeter 24 preferably includes a generally arcuate shaped corner 34, 36, 38, 40 associated with the intersection of each respective adjacent edge 26, 28 and end 30, 32 associated with perimeter 24. As alluded to above, body 22 has a generally rectilinear shape as indicated by an imaginary line longitudinal axis 42 and an imaginary line lateral axis 44. Although body 22 is shown as having a generally rectilinear shape, it is appreciated that body 22 could be provided in virtually any shape such as round, square, or shapes having other numbers of sides rather than four.

Regardless of the generally planar shape, it is still further appreciated that cutting board 20 can be provided in various sizes relative to the respective shape associated with lateral dimension 48 as well as various lengths as indicated by dimension line 50. It is further appreciated that corners 34, 36, 38, 40 associated with perimeter 24 could be provided in shapes other than the generally arcuate shape as shown. Preferably, the size and shape of body 22 is selected to provide the desired area associated with the cutting surface of cutting board 20 for an intended application. For instance, as disclosed further below, it is envisioned that a cutting board associated with use by single users and/or activities associated with pairing fruit or vegetables may have a smaller footprint associated with the cutting area than a cutting board intended for commercial use or preparation of larger food stuffs such as preparation of chicken, larger fish, or cuts of meat products.

The intersection of imaginary dimension lines 50, 52, 54, 56 associated with edges 26, 28 and ends 30, 32 associated with perimeter 24, minus the area associated with the arcuate shape of corners 34, 36, 38, 40, generally defines the plan view footprint 58 or area associated with use of cutting board 20. Understandably, were corners 34, 36, 38, 40 associated with perimeter 24 provided in the generally orthogonal construction, the area associated with footprint 58 would simply be the multiplication of the respective lateral dimension 48 and longitudinal dimension line 50 associated with the plan view of body 22 of cutting board 20. As disclosed above, cutting board 20 can be provided in virtually any size and shape such as, and merely exemplary, a 12"×18" cutting board.

Figure 1:
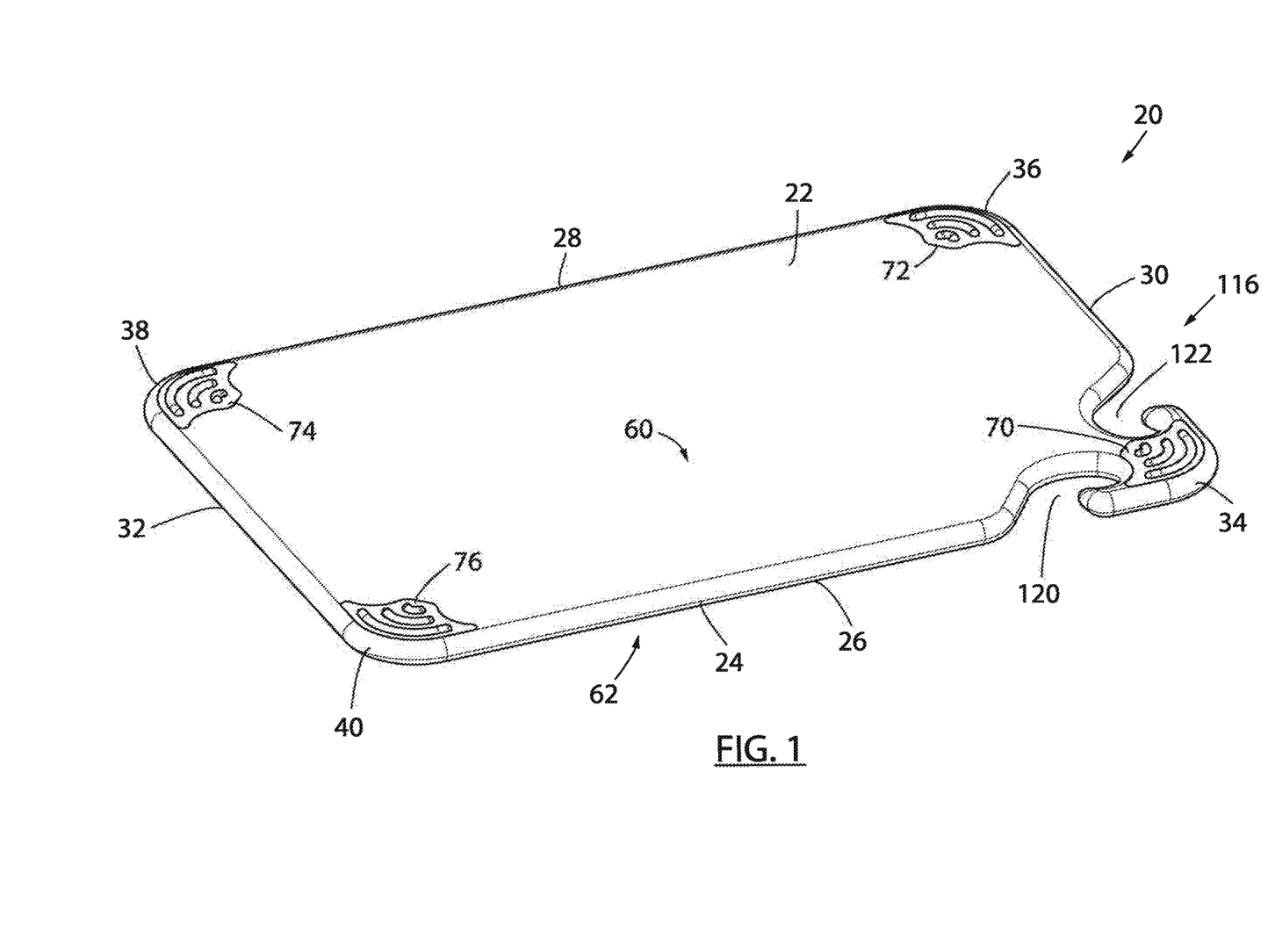
FIG. 1 is an isometric view of a cutting board according to the present invention.
Figure 7:
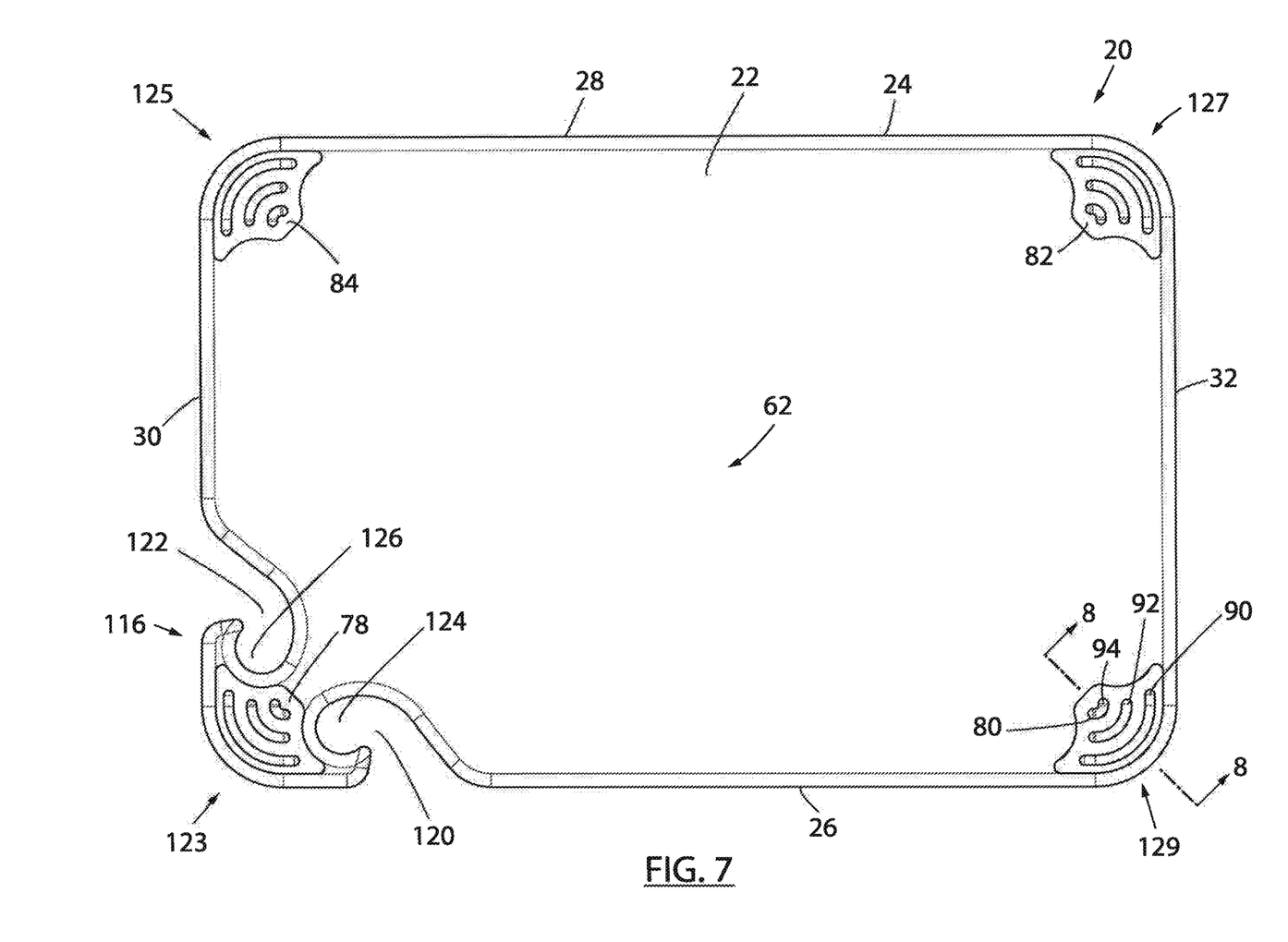
FIG. 7 is a view similar to FIG. 2 of a second cutting surface of the cutting board shown in FIG. 1.

Referring to FIGS. 1 and 7, body 22 preferably defines a first cutting surface 60 (FIG. 1) associated with a first planar side thereof and preferably provides another cutting surface 62 (FIG. 7) generally opposite thereof. Although cutting board 20 is shown as having two cutting surfaces, commonly referred to as a reversible cutting board, it is appreciated that cutting board 20 could be provided to having only one cutting surface. Referring to FIGS. 1, 2, and 7, cutting board 20 preferably includes a plurality of feet, bumpers, or pads 70, 72, 74, 76 (FIGS. 1, 2) associated with cutting surface 60 and another set of feet, bumpers, or pads 78, 80, 82, 84 associated with the generally opposite planar side associated with cutting surface 62. Understandably, if constructed to provide one cutting surface, the discrete pads are preferably configured to extend from the non-use or counter facing side of body 22. It is appreciated that although pads 70-84 provide a slip resistant interaction with the support surface, pads 70-84 are optional. If omitted, it is appreciated that a towel or supplemental support may be disposed between a respective board 20 and an underlying support surface so as to mitigate undesired translation of board 20 relative to the support surface during use thereof.

Figures 3, 4:
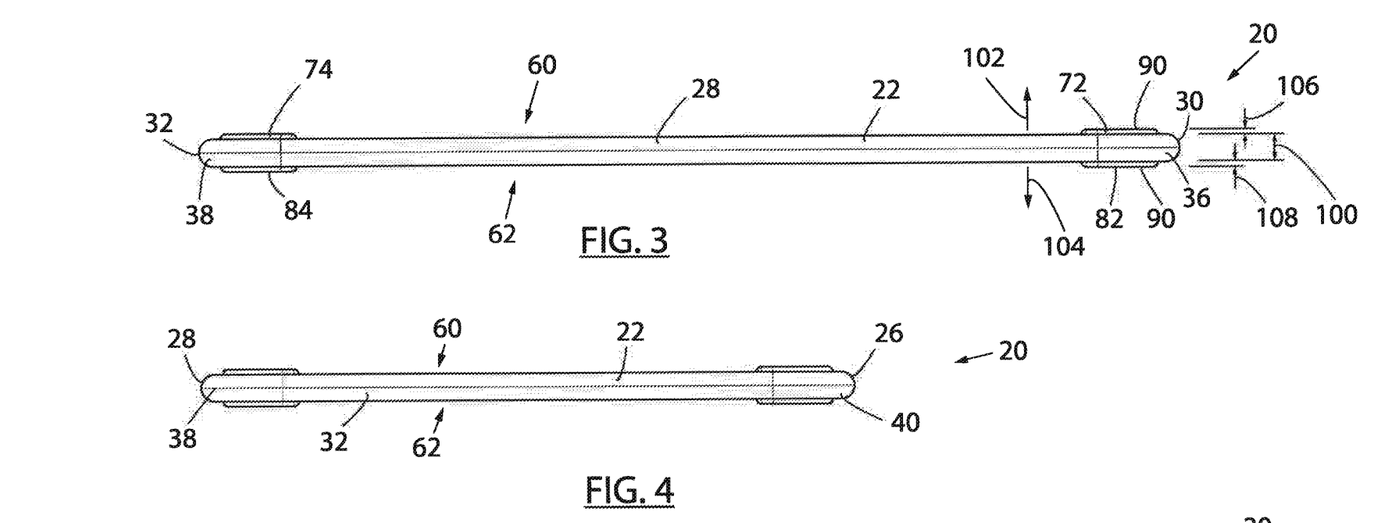
FIG. 3 is a side elevation view of a longitudinal edge opposite a handle of the cutting board shown in FIG. 1.
FIG. 4 is a side elevation view of a lateral edge opposite a handle of the cutting board shown in FIG. 1.
Figure 5:
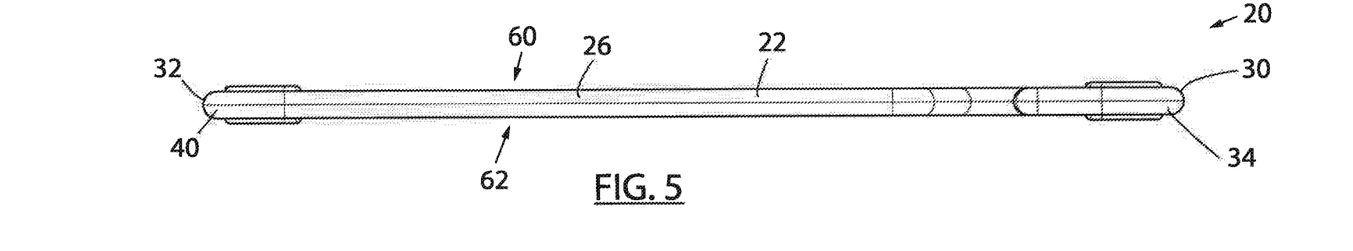
FIG. 5 is a side elevation view of a longitudinal edge associated with a handle of the cutting board shown in FIG. 1.
Figure 6:
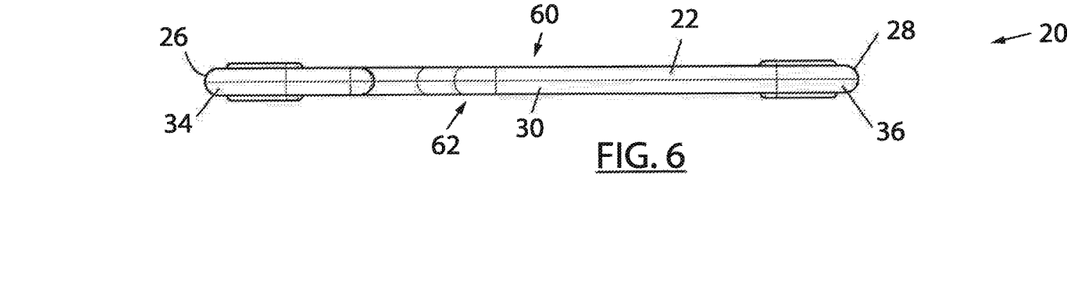
FIG. 6 is a side elevation view of a lateral edge associated with a handle of the cutting board shown in FIG. 1.
Figure 8:
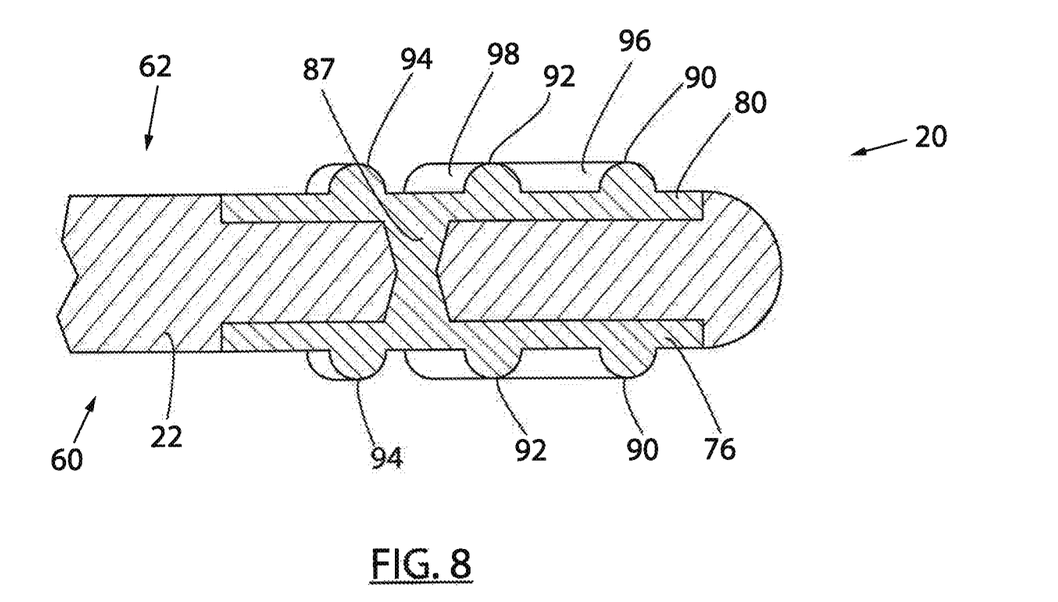
FIG. 8 is a cross-section elevation view of the cutting board shown in FIG. 1.

Each pad 70-84 is preferably constructed of a silicone or rubber type material having a higher coefficient of friction than the material associated with respective cutting surfaces 60, 62 of body 22 of cutting board 20. Referring to FIGS. 3, 7, and 8, each pad 70-84 preferably includes one or more projections 90, 92, 94 that each have a generally arcuate shape and include a channel or groove 96, 98 formed between adjacent projections 90, 92, 94. Projections 90-94 preferably have an arcuate shape that is curved toward an axis that oriented nearer a center of cutting board 20 rather than an axis that oriented radially outboard thereof.

Regardless of the shape of each of the discrete pads 70-84 and/or projections 90-94, it is further appreciated that one or more of pads 70-84 and/or projections 90-94 can be "coded" so as to provide an indication as to the intended use of the discrete cutting board 20 associated therewith. For instance, when used in commercial environments, various regulations, such as Hazard Analysis and Critical Control Points (HACCP) certification programs, define limitations on the use of cutting boards in commercial environments to mitigate cross contamination between both the raw and the cooked food stuffs prepared therewith. One approach to satisfy the HACCP certifications is to provide a color coding, such as red for meat, yellow for poultry, green for vegetables, etc. associated with the intended use of a discrete cutting board 20. Depending on the food stuffs being prepared, multiple discrete cutting boards 20 may be used and transported at various times during the food preparation processes. Providing a color coding associated with one or more of pads 70-84, projections 90-94, and/or discrete cutting boards 20 of multiple cutting boards 20 allows users to quickly assess the cutting board 20 suitable to a given application whereas handle 116 as disclosed further below facilitates user interaction and transport of one or more cutting boards 20 in a manner that mitigates the potential of contamination therebetween.

Referring to FIG. 3, body 22 of cutting board 20 has a thickness 100 that is preferably between at least ⅛ inch and ¾ inch thick. In a preferred aspect, thickness 100 is ½ inch. Projections 90, 92, 94 associated with each pad 70-84 extend beyond the respective cutting surface 60, 62 in a generally outward lateral direction, indicated by arrows 102, 104. Preferably, as indicated by dimensions 106, 108, each projection extends between 1/32 and 3/16 of an inch beyond the respective cutting surface 60, 62 with which the discrete pad 70-84 is associated. Projections 90, 92, 94 associated with respective pads 70-84 provide a robust somewhat pliable tactile interaction between cutting board 20 and an underlying support surface such as a countertop or the like. Whereas body 22 of cutting board 20 is constructed of a knife friendly yet generally robust and rigid material, pads 70-84 are constructed of a more pliable and preferably rubber or silicone type material or material having a higher coefficient of friction than the material of body 22 of cutting board 20. The association of a plurality of pads 70-84 with each respective side associated with cutting surfaces 60, 62 of cutting board 20 allows cutting board 20 to provide similar performance characteristics regardless of which discrete cutting surface 60, 62 is being used.

Preferably, pads 70-84 are formed via a molding, co-molding, or over-molding process associated with the formation of body 22 of cutting board 20. It should be appreciated that pads 70-84 can be associated with only one side of cutting board 20 if cutting board 20 is configured to provide only one cutting surface. Alternatively, when provided as a reversible cutting board, pads 70-84 associated with discrete corners of body 22 can be fully supported by body 22 or, as shown in FIG. 8, include one or more web portions 87 that extend through body 22 of cutting board 20 and are integrally formed during the molding process to provide a connection structure between discrete pairs of pads 70-84 that are associated with a common corner of each of corners 123-129 of cutting board 20.

Referring to FIGS. 1-7, cutting board 20 includes a handle 116 that is defined by body 22 of cutting board 20. Handle 116 is offset in the lateral direction, indicated by arrows 118, relative to longitudinal axis 42, and is offset in the longitudinal direction, indicated by arrow 119, relative to lateral axis 44. Although handle 116 is shown as being oriented proximate at least one respective corner 123, 125, 127, 129 of body 22 of cutting board 20, it is appreciated that handle 116 may be oriented at other positions relative to the perimeter of body 22 and which maintain the offset association of handle 116 relative to lateral and longitudinal axis of body 22.

Whether oriented at a respective corner or other orientations offset from respective axis 42, 44, handle 116 has a generally T-shape that is defined by a respective first groove, channel, or cutout 120 and another or second respective groove, channel, or cutout 122 formed in body 22 and defined by perimeter 24 thereof. Cutouts 120, 122 are oriented radially inboard relative to a respective edge 26, 28 or end 30, 32 of body 22 and are associated with a common corner 123, 125, 127, 129 of body 22 of cutting board 20. Perimeter 24 of body 22 flows generally smoothly and continuously from the discrete lateral or longitudinal edge or end of body 22, through the respective cutouts 120, 122, and about handle 116. As disclosed further below, each of cutouts 120, 122 define a respective first grip site 124 and a second grip site 126 associated with user interaction with handle 116. As disclosed further below, grip sites 124, 126 are constructed to concurrently cooperate with respective fingers of a user during transport of cutting board 20. Similarly, each of grip sites 124, 126 provide a hanging structure associated with facilitating hanging storage of cutting board 20.

Figure 9:
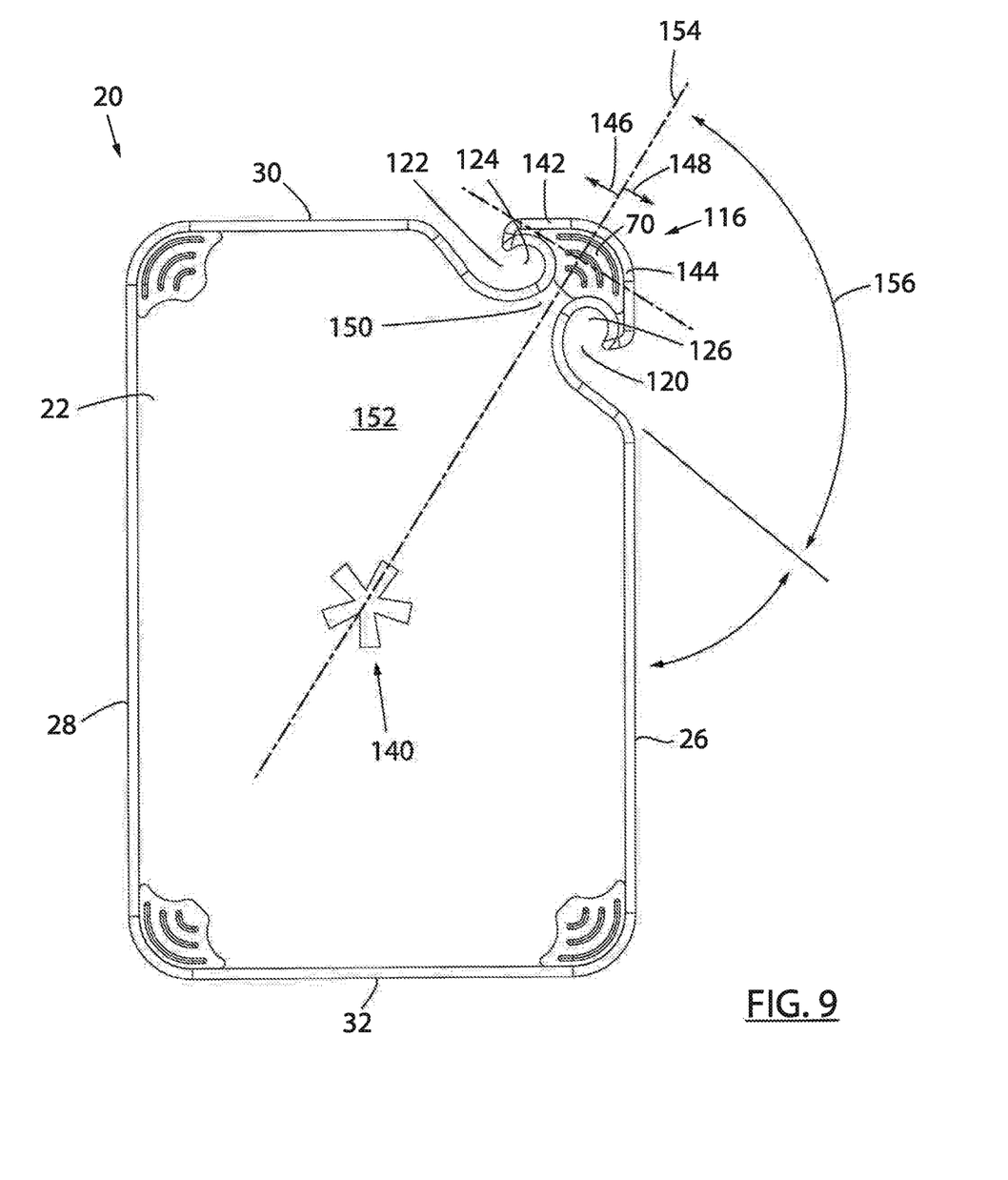
FIG. 9 is a view similar to FIG. 2 and includes various exemplary dimensions associated with the handle defined by the cutting board shown in FIG. 1.
Figure 10:
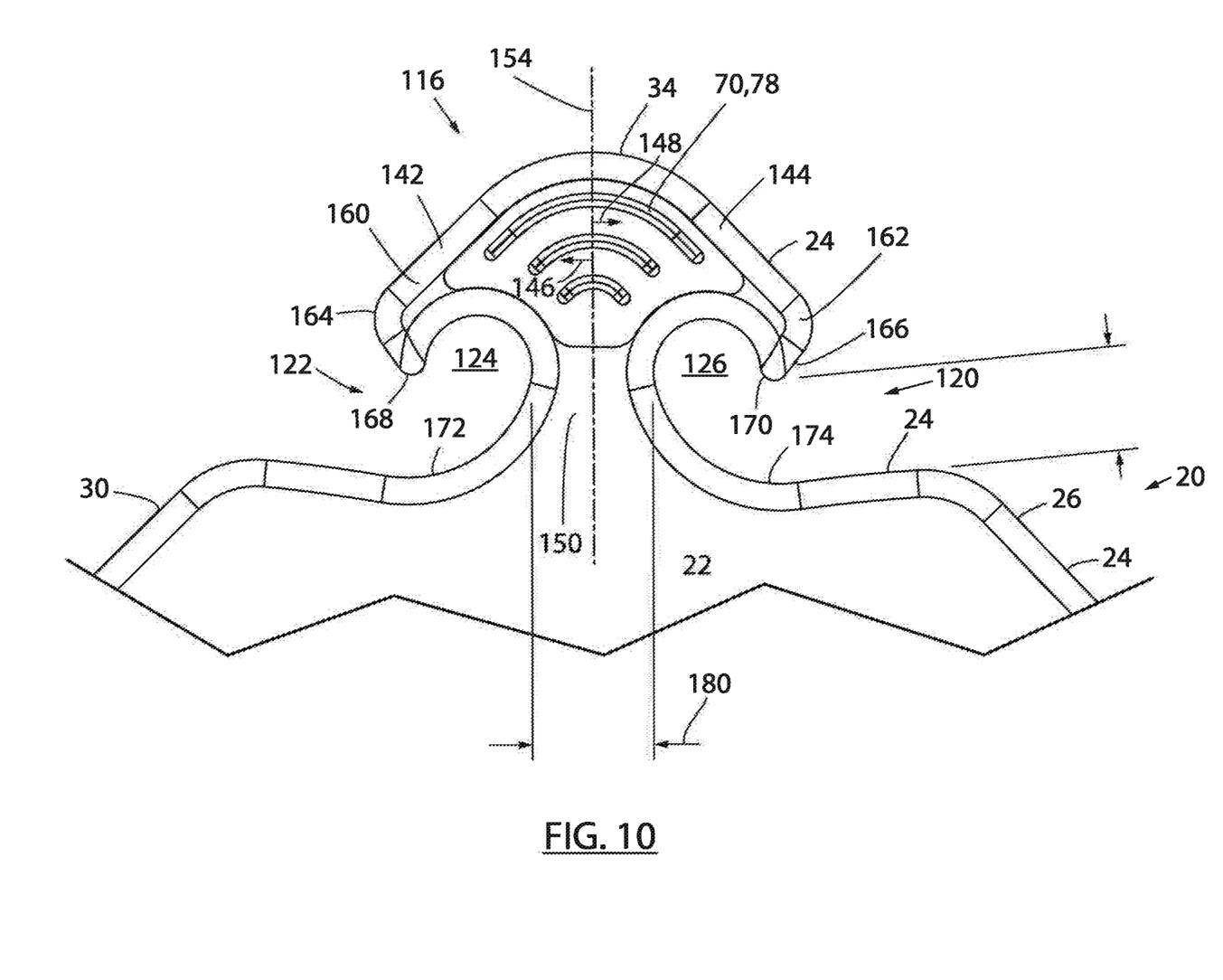
FIG. 10 is a detailed plan view of the handle of the cutting board shown in FIG. 1.

Referring to FIGS. 9 and 10, body 22 of cutting board 20, and the discrete pads 70-84 associated therewith, defines a center of gravity 140 of cutting board 20 that is laterally and longitudinally offset from handle 116. It should be appreciated that cutouts 120, 122 slightly manipulate the position of the center of gravity 140 to a location that is slightly offset from the intersection of the lateral and longitudinal axis 42, 44 (FIG. 2). It should be appreciated that were cutting board 20 formed to include the masses omitted by the construction of cutouts 120, 122, such a modification would result in a geometrically uniform shape of cutting board 20 such that the center of gravity would be coincident with respect to the intersection of axis 42, 44. However, such a modification would also negate the functionality associated with handle 116 as disclosed further below.

Handle 116 includes respective projections 142, 144 that extended opposite outward lateral directions, indicated by arrows 146, 148, relative to an axis 154 associated with a stem portion or stem 150 that extends between the principle cutting surfaces 152 of cutting board 20. Respective projections 142, 144 associated with handle 116 are offset from the principle cutting surfaces by the voids formed by respective cutouts 120, 122. Axis 154 associated with stem 150 is coincident with center of gravity 140 and is preferably oriented at approximately 90°, as indicated by angle 156, relative to respective grip sites 124, 126 defined by handle 116. Preferably, angle 156 is within approximately 5° of an orthogonal orientation relative to axis 154 associated with stem 150 and center of gravity 140. An angle between edge 26 relative to the crossing directions 146, 148 associated with projections 142, 144 of handle 116 can vary as a function of the size of cutting board 20 in as much as such deviations manipulate the position of center of gravity 140 relative to handle 116.

Although handle 116 has a generally integral construction and is formed during the formation of body 22 of cutting board 20, the geometry of handle 116 is defined by first projection 142 and second projection 144 that extend in a tapered manner in generally opposite directions relative to axis 154 and in directions that are generally aligned with the respective edge 26 and end 30 of body 22 of cutting board 20. Projections 142, 144 each define a respective cantilevered portion 160, 162 that generally overhangs the respective cutout 120, 122 associated with discrete grip sites 124, 126.

Respective cantilevered portions 160, 162 of handle 116 terminate at respective free or distal ends 164, 166 and include a nipple or lip 168, 170 formed thereat. Lips 168, 170 are oriented to extend in a generally inward radial direction relative to the respective void associated with cutouts 120, 122 and grip sites 124, 126 of handle 116. Preferably, lips 168, 170 terminate no nearer than preferably approximately ¾ of an inch from an opposing surface 172, 174 defined by perimeter 24 of body 22 associated with discrete cutouts 120, 122. Such a consideration allows the fingers of the user to translate in a crossing direction to engage retrospective cutouts 120, 122 rather than being solely able to be slid into the discrete grip sites via a direction normal to the plane defined by the cutting surfaces of board 20.

The inward extending orientation of lips 168, 170 relative to respective grip sites 124, 126 further provides a positive tactile interaction of the user's fingers when engaged therewith. Preferably, stem 150 has a lateral width, indicated by dimension 180, that is no less than a quarter inch and no greater than 1¼ inches wide. Such a construction provides suitable strength between handle 116 and the remainder of body 22 of cutting board 20 without creating unnecessary discomfort associated with the gap between respective fingers of the user when engage with both of grip sites 124, 126. When held in a user's hand, corner 34 associated with perimeter 24 and handle 116 can be engaged with the palm of the user such that handle 116 can be effectively grasped via the cooperation of the user's palm with corner 123 and one or more respective fingers with one or more of discrete grip sites 124, 126. Although pad 70, 78 is shown as being oriented within the footprint of handle 116 bounded by perimeter 24 of cutting board 20, is appreciated that the resilient and/or rubber type material associated with respective pad 70, 78 associated with handle 116 can be molded about the entirety of handle 116 so as to improve the users comfort associated with interaction therewith.

Figure 11:
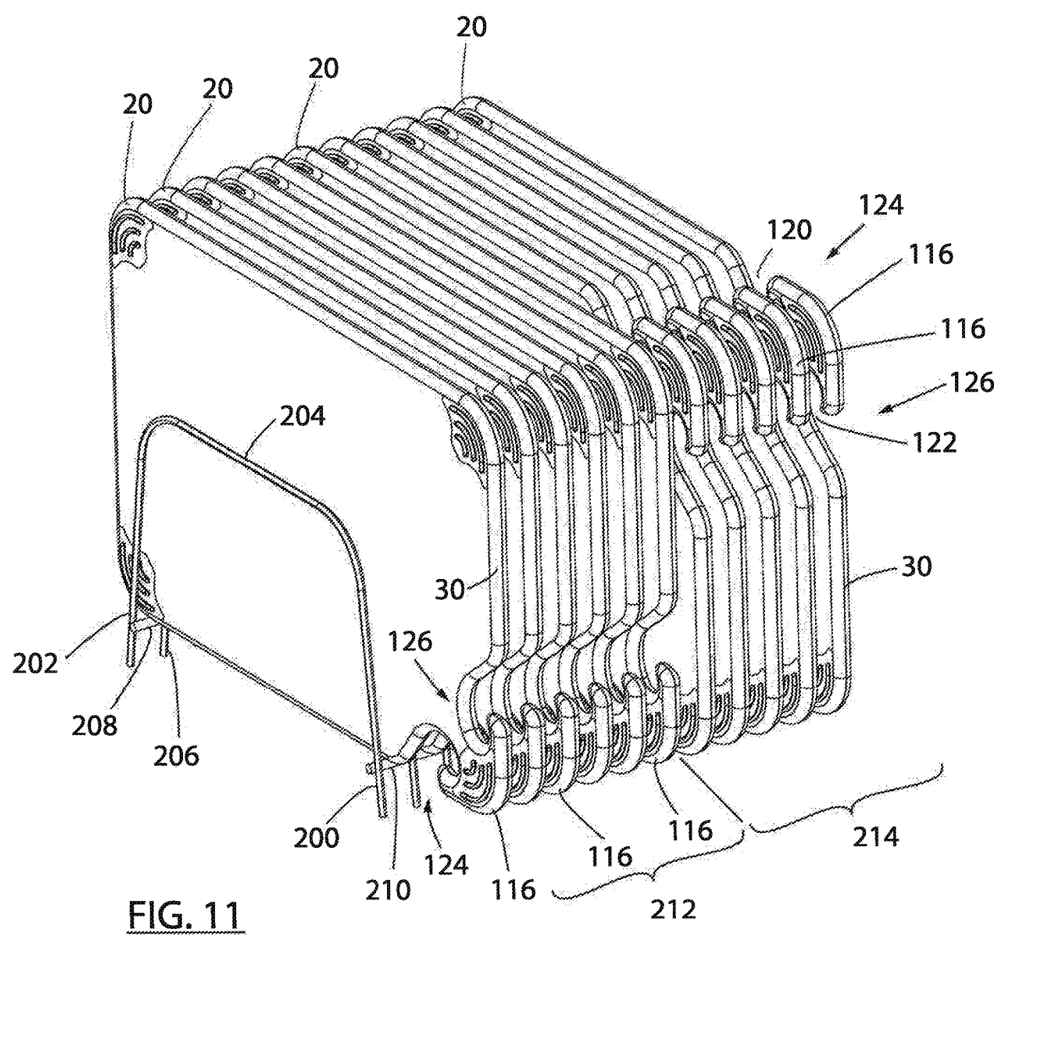
FIG. 11 is a perspective view of various cutting boards as shown in FIG. 1 associated with a drying or storage rack.
Figure 12:
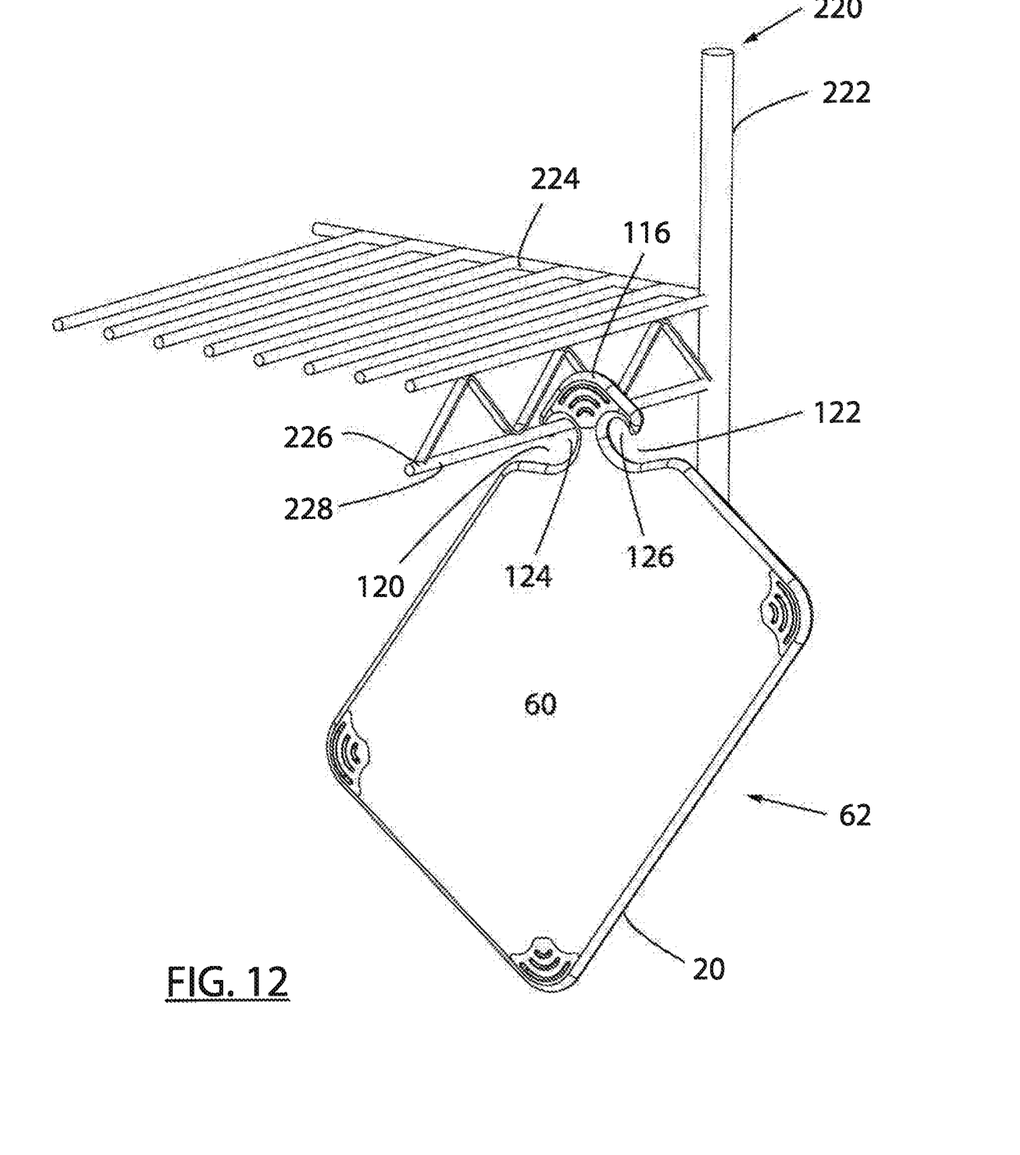
FIG. 12 is a perspective view of the cutting board shown in FIG. 1 associated with a portion of a wire forms assembly such as a bakers rack.

FIGS. 11 and 12 show various storage methodologies associated with the customary use of one or more of cutting boards 20. Referring to FIG. 11, multiple cutting boards 20 are shown associated with an ancillary kitchen appliance such as a drying rack 200 or the like. Such drying racks can be provided in various configurations although drying rack 200 is shown is being formed as a wire form assembly 202 that includes a number of upstanding members or portions 204 and a number of legs or feet 206 that extend therefrom. One or more lateral members 208, 210 interconnect the respective upstanding portions 204 which are configured to maintain separation between generally planar shaped devices that are horizontally stacked therein. The spaced orientation is desired as the same promotes air flow and drying of wares associated with rack 200.

By way of example, a first group of cutting boards 212 are associated with drying rack 200 and orientated such that discrete handles 116 are oriented in a generally downward facing direction. A second group of cutting boards 214 are oriented in an opposite orientation wherein discrete handles 116 are oriented in a substantially upward facing orientation. Although all handles 116 are shown as being oriented in a generally front facing direction, it is appreciated that one or more cutting boards 20 could be associated with rack 200 and oriented to face in the opposing direction should it be desired to access the same from opposing sides toward work surfaces that face one another. Additionally, although shown as being generally horizontally oriented, it is further appreciated that cutting boards 20 could be vertically positioned relative to rack 200.

Whether oriented in the upward, downward, forward, or rearward facing orientation associated with respective groups 212, 214 of cutting boards 20, at least one grip site 124, 126 associated with each cutting board 20 associated with each group of cutting boards 212, 214 remains exposed relative to the respective stack of cutting boards 20. Such consideration not only allows the user to readily visually inspect the position or location of discrete handles 116 but also facilitates expedient user interaction therewith. That is, cutting boards 20 associated with group 212 of cutting boards 20 can be readily removed from drying rack 200 via interaction with grip site 124 and either lateral or vertical extraction of the discrete cutting board 20 intended to be removed therefrom. More advantageously, second group 214 of cutting boards 20 are each oriented such that either of grip sites 124, 126 can be engaged by a user to facilitate removal or extraction of each of the discrete cutting boards 20 from drying rack 200. Positioning of discrete handles 116 relative to a respective corner 123-129 provides a cutting board 20 having multiple grip sites 124, 126 that are positioned adjacent one another yet formed along adjacent respective end or edge portions of each discrete cutting board 20. Such a consideration facilitates improved user interaction with cutting board 20 and ancillary storage associated therewith.

As shown in FIG. 12, handle 116 also facilitates hanging storage associated with the discrete cutting board 20. As shown therein, a wire form assembly such as a storage or baker rack 220 includes a number of upstanding members 222 and commonly a plurality of wire form shelf members 224 associated therewith. Shelf members 224 commonly include one or more trusses or support sections 226 that extend along the underside of the discrete shelves. Handle 116 can be conveniently hung from a horizontal member 228 associated with support sections 226 and/or shelf members 224 without substantially interfering with storage of other supplies and or materials relative to shelf members 224. It should be further appreciated that horizontal member 228 associated with shelf member 224 can be engaged with either of cutouts 120, 122 defined by cutting board 20 to facilitate a hanging orientation thereof. It should be still further appreciated that engagement of one of cutouts 120, 122 with horizontal member 228 of shelf member 224 leaves the opposing cutout 120, 122, and the respective grip site 124, 126 associated therewith, unobstructed for user interaction with handle 116 during removal of cutting board 20 from rack 220. Such a consideration reduces the potential for gripping of cutting board 20 by a user in a manner wherein the user's hands, which may be soiled with foodstuffs or the like, contact or otherwise contaminate cutting surfaces 60, 62 associated with cutting board 20.

Figure 13:
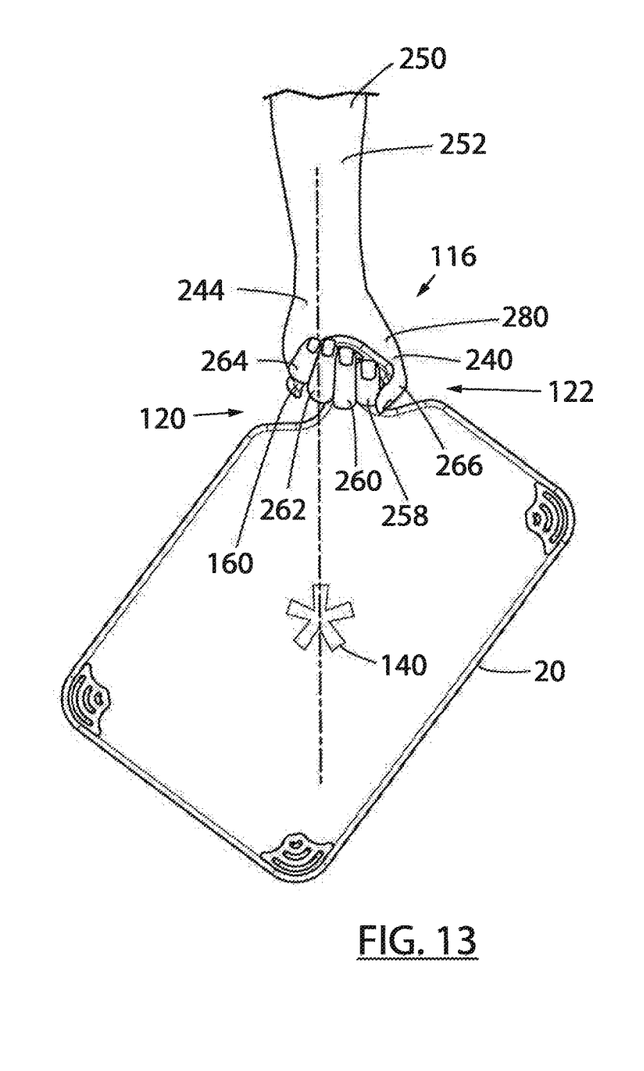
FIG. 13 is a plan view of the cutting board shown in FIG. 1 during transport via a left hand of a user.
Figure 14:
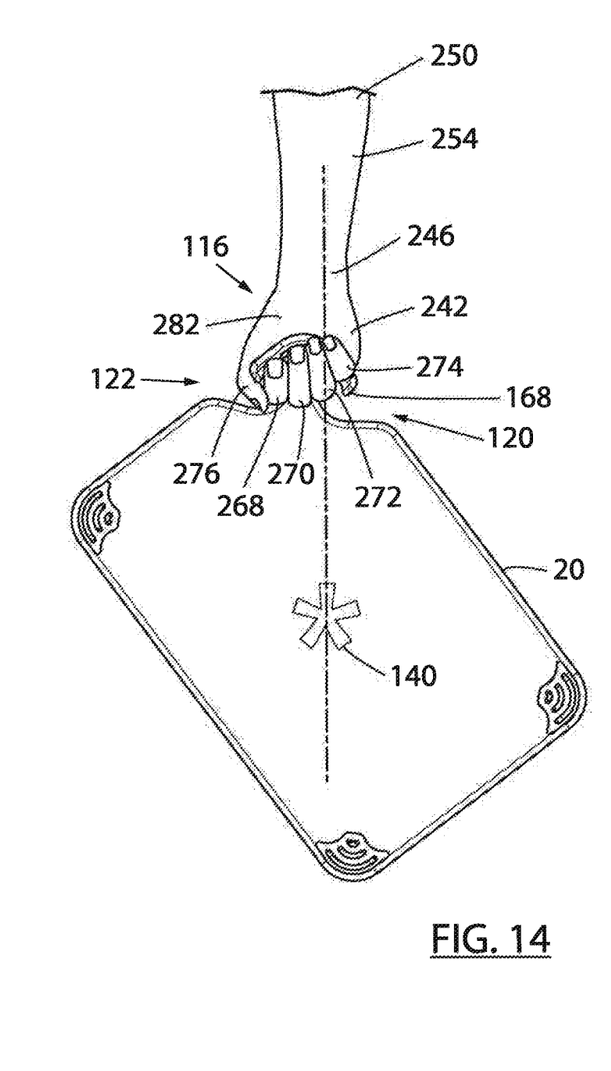
FIG. 14 is a plan view of the cutting board shown in FIG. 1 during transport via a right hand of a user.

Referring to FIGS. 13 and 14, during transport of cutting board 20, with either of a left-hand 240 or a right-hand 242 of a user 250, center of gravity 140 of cutting board 20 generally aligns a respective wrist 244, 246 and a respective forearm 252, 254 of user 250 at orientations that closely or substantially simulate an at rest orientation of the user's hand, wrist, and forearm and in a manner generally aligned with center of gravity 140 of cutting board 20 when oriented in a downward gravitationally suspended orientation. Such considerations reduce the stress and strain associated with user interaction with cutting board 20 during transport operations.

Further, handle 116 is constructed such that one or more fingers and/or the thumb 258-276 of either of the respective left or right hands 240, 242 of user 250 can securely engage handle 116 of cutting board 20. It is further appreciated that the palm 280, 282 of the respective left or right hand 240, 242 of user 250 can generally overlie a surface of handle 116 that faces in either of the respective outboard lateral directions associated with cutting surface 60 or cutting surface 62. That is to say, handle 116 of cutting board 20 is constructed to be reversibly gripped by either of the left-hand 240 or right-hand 242 of the user 250 in accordance with the user's preference and/or the location or orientation of cutting board 20 during interaction therewith. Further, the inward radial extension associated with lips 168, 170 associated with grip sites 124, 126 provides a secure tactile interaction with the respective one or more of fingers and/or thumb 258-276 of either of the left-hand or right-hand 240, 242 of user 250 when engaged therewith. Such considerations limit swinging and/or lateral translation of handle 116 relative to the respective hand of user 250 during transport and further improve the comfort of the users grip associated with interaction of handle 116 of cutting board 20 during transport and use thereof.

Various aspects of the invention are described in detail with reference to the drawings, wherein like reference numerals represent like parts and assemblies throughout the several views. Reference to one embodiment does not limit the scope of the claims attached hereto. Additionally, any examples set forth in this specification are not intended to be limiting and merely set forth some of the many possible embodiments for the appended claims.

What we claim is:

1. A cutting board comprising:
    a body having an upper facing surface and downward facing surface;
    a perimeter of the body that extends between the upper facing surface and the downward facing surface;
    a first grip site and a second grip site that are each defined by a respective cutout defined by the body and oriented along the perimeter of the body; and
    a stem defined by the body and that extends between the first grip site and the second grip site such that a surface of the stem is coplanar with at least one of the upper facing surface and the downward facing surface of the body that extends between the respective cutouts associated with the first grip site and the second grip site.

2. The cutting board of claim 1 wherein the perimeter is further defined by opposing edge portions and opposing end portions and the respective cutout associated with the first grip site is associated with a respective one of the opposing edge portions of the perimeter and the respective cutout associated with the second grip site is associated with a respective one of the opposing edge portions of the perimeter.

3. The cutting board of claim 1 wherein the first grip site and the second grip site are disposed proximate a common corner associated with the perimeter of the body such that the first grip site is oriented along an edge portion of the perimeter and the second grip site is oriented along an end portion of the perimeter.

4. The cutting board of claim 1 further comprising at least one pad associated with at least one of the upper facing surface and the downward facing surface of the body and oriented to extend beyond a plane defined by the respective at least one of the upper facing surface and the downward facing surface and is disposed radially outboard relative to the stem between the respective cutouts.

5. The cutting board of claim 4 wherein an axis defined by the stem is oriented to be generally aligned with a center of gravity of the body of the cutting board when the axis defined by the stem is oriented vertically.

6. The cutting board of claim 1 further comprising at least one pad associated with at least one of the upper facing surface and the downward facing surface of the body and oriented to extend beyond a plane defined by the respective at least one of the upper facing surface and the downward facing surface.

7. The cutting board of claim 6 wherein the at least one pad is constructed of a material having a higher coefficient of friction than a coefficient of friction of a material that forms the body.

8. A cutting board comprising:
    a body that defines a footprint associated with at least one cutting surface and is circumscribed by a boundary of the footprint, wherein the body extends continuously within the boundary of the footprint; and a handle defined by the body and offset from a longitudinal centerline axis of the body, the handle having a first cantilevered portion and a second cantilevered portion and oriented relative to the body such that an axis located between the first cantilevered portion and the second cantilevered portion extends along a stem that is coplanar with the body and the axis is oriented at an acute angle relative to the longitudinal centerline axis of the body and intersects a center of gravity of the body when the body is supported by the handle.

9. The cutting board of claim 8 wherein the first cantilevered portion, the second cantilevered portion, and the stem that extends along the axis located between the first cantilevered portion and the second cantilevered portion define a T-shape wherein a top of the T-shape is defined by the first cantilevered portion and the second cantilevered portion.

10. The cutting board of claim 8 further comprising a pad associated with a plurality of corners of body and wherein each pad extends beyond the at least one cutting surface.

11. The cutting board of claim 8 wherein the at least one cutting surface is further defined a first cutting surface defined by at least a portion of a first side of the body and another cutting surface that is defined by at least a portion of a second side of the body.

12. The cutting board of claim 11 further comprising a plurality of pads associated with each of the first side and the second side of the body, where each pad is associated with a respective corner of the body.

13. The cutting board of claim 12 further comprising at least one arcuate groove formed in at least one of the plurality of pads.

14. The cutting board of claim 8 further comprising a lip formed at a distal end of at least one of the first cantilevered portion and the second cantilevered portion and wherein the lip extends radially inward relative to the at least one of the first cantilevered portion and the second cantilevered portion.

15. A method of forming a cutting board, the method comprising:
    forming a body having a generally planar shape and a thickness;
    defining a handle with a portion of the body such that the handle includes a first hook portion, a second hook portion, and a stem portion located between the first hook portion and the second hook portion and having opposing sides that are coplanar with opposing sides of the generally planar shape of the body, wherein the stem portion is grippable; and
    orienting the first hook portion to open toward a longitudinal end of the body and orienting the second hook portion to open toward a lateral edge of the body.

16. The method of claim 15 further comprising orienting the handle such that an axis between the first hook portion and the second hook portion extends along the stem portion and intersects a center of gravity of the body when the body is suspended from the first hook portion and the second hook portion.

17. The method of claim 15 further comprising providing at least one pad that extends from the body in a direction in a direction aligned with a direction of the thickness of the body.

18. The method of claim 15 further comprising forming a lip proximate a distal end of each of the first hook portion and the second hook portion.

19. The method of claim 18 further comprising forming the lip to extend in an inward radially direction toward a center of the generally planar shape of the body.

20. The method of claim 15 further comprising forming a first cutting surface on a first side of the generally planar shape of the body and forming a second cutting surface on a second side of the generally planar shape of the body opposite the first side.

* * * * *